(12) United States Patent
Backhouse

(10) Patent No.: US 10,562,241 B2
(45) Date of Patent: Feb. 18, 2020

(54) FAN BLADE AND METHOD OF MANUFACTURING A FAN BLADE

(71) Applicant: ROLLS-ROYCE plc, London (GB)

(72) Inventor: Robert C Backhouse, Wells (GB)

(73) Assignee: ROLLS-ROYCE plc, London (GB)

( * ) Notice: Subject to any disclaimer, the term of this patent is extended or adjusted under 35 U.S.C. 154(b) by 381 days.

(21) Appl. No.: 15/472,961

(22) Filed: Mar. 29, 2017

(65) Prior Publication Data

US 2017/0282466 A1    Oct. 5, 2017

(30) Foreign Application Priority Data

Apr. 5, 2016    (GB) .................................. 1605793.7

(51) Int. Cl.
| | |
|---|---|
| *B29C 70/38* | (2006.01) |
| *F04D 29/32* | (2006.01) |
| *F01D 25/24* | (2006.01) |
| *F01D 5/28* | (2006.01) |
| *F01D 9/04* | (2006.01) |

(Continued)

(52) U.S. Cl.
CPC ............ *B29C 70/382* (2013.01); *B22F 7/064* (2013.01); *F01D 5/282* (2013.01); *F01D 9/041* (2013.01); *F01D 25/24* (2013.01); *F04D 29/023* (2013.01); *F04D 29/324* (2013.01); *F04D 29/388* (2013.01); *F04D 29/522* (2013.01); *F04D 29/542* (2013.01); *B29K 2063/00* (2013.01); *B29K 2305/00* (2013.01); *B29K 2307/04* (2013.01); *B29L 2031/082* (2013.01); *F05D 2220/36* (2013.01); *F05D 2300/10* (2013.01);

(Continued)

(58) Field of Classification Search
CPC .......... F01D 5/288; F01D 5/282; F01D 5/286; F01D 5/28; F01D 5/14; B23B 15/08; B23B 15/082; B23B 15/085; B23B 15/088; B23B 15/09; B23B 15/092; B23B 15/095; B23B 15/098; B29C 7/30; B29C 7/38; F04D 29/38; F05D 2240/303; Y10T 29/49337

See application file for complete search history.

(56) References Cited

U.S. PATENT DOCUMENTS

| | | |
|---|---|---|
| 3,189,054 A | 6/1965 | Rucks et al. |
| 3,892,612 A | 7/1975 | Carlson et al. |

(Continued)

FOREIGN PATENT DOCUMENTS

| | | |
|---|---|---|
| GB | 1294285 A | 10/1972 |
| WO | 2007/037695 A1 | 4/2007 |

OTHER PUBLICATIONS

Sep. 9, 2016 Search Report issued in British Patent Application No. 1605793.7.

*Primary Examiner* — Jason L Vaughan
(74) *Attorney, Agent, or Firm* — Oliff PLC

(57) ABSTRACT

The application describes methods of making composite bodies including fibre-reinforced composite material with carbon fibre reinforcement and also a metal-containing portion (4). The metal-containing portion (4) is formed by laying up metal reinforcement elements, such as tapes of titanium alloy, among the carbon fibre reinforcement tapes which make up the composite body. The proportion of metal reinforcement may increase progressively towards the surface and/or towards an edge (14) of the composite body. In an example, metal leading and trailing edges (14,15) of a fan blade (1) are integrally formed in this way.

11 Claims, 6 Drawing Sheets

(51) Int. Cl.
*B22F 7/06* (2006.01)
*F04D 29/02* (2006.01)
*F04D 29/38* (2006.01)
*F04D 29/52* (2006.01)
*F04D 29/54* (2006.01)
*B29K 63/00* (2006.01)
*B29K 305/00* (2006.01)
*B29K 307/04* (2006.01)
*B29L 31/08* (2006.01)

(52) U.S. Cl.
CPC ... *F05D 2300/224* (2013.01); *Y10T 29/49337* (2015.01)

(56) References Cited

U.S. PATENT DOCUMENTS

| | | | | |
|---|---|---|---|---|
| 4,795,313 A * | 1/1989 | Coulon | ............... | C22C 33/0292 416/224 |
| 5,123,814 A * | 6/1992 | Burdick | ............... | F04D 29/388 29/889.3 |
| 5,174,024 A * | 12/1992 | Sterrett | ............... | B64C 27/46 29/889.71 |
| 5,210,946 A * | 5/1993 | Monroe | ............... | F04D 29/289 29/525.07 |
| 5,439,353 A * | 8/1995 | Cook | ............... | B29C 70/86 416/229 R |
| 5,448,828 A * | 9/1995 | Willems | ............... | B22F 7/06 29/889.1 |
| 5,449,273 A * | 9/1995 | Hertel | ............... | F01D 5/147 205/271 |
| 5,672,417 A * | 9/1997 | Champenois | ............ | F01D 5/282 416/230 |
| 5,876,651 A * | 3/1999 | Blackburn, Jr. | ......... | B32B 37/00 264/265 |
| 5,965,240 A * | 10/1999 | Blackburn | ............... | B32B 37/00 428/192 |
| 6,132,857 A * | 10/2000 | Champenois | ....... | B29C 37/0082 416/224 |
| 8,834,126 B2 * | 9/2014 | Hansen | ............... | B23P 9/04 29/458 |
| 9,296,072 B2 * | 3/2016 | Dambrine | ............... | B21D 53/78 |
| 2008/0152858 A1 * | 6/2008 | Schreiber | ............... | B21D 53/78 428/68 |
| 2009/0269596 A1 | 10/2009 | Rocker et al. | | |
| 2010/0028160 A1 * | 2/2010 | Schaeffer | ............... | F01D 5/005 416/224 |
| 2012/0037602 A1 * | 2/2012 | Doorbar | ............... | C22C 47/04 219/121.14 |
| 2012/0317810 A1 * | 12/2012 | Klein | ............... | B21D 26/023 29/889.71 |
| 2013/0004323 A1 * | 1/2013 | Hansen | ............... | B23P 9/04 416/224 |
| 2013/0185938 A1 * | 7/2013 | Dambrine | ............... | B21D 53/78 29/889.71 |
| 2013/0312261 A1 * | 11/2013 | Godon | ............... | B21D 53/78 29/889.71 |
| 2013/0333215 A1 * | 12/2013 | Godon | ............... | B23K 20/021 29/889.71 |
| 2015/0086378 A1 * | 3/2015 | Klein | ............... | F01D 5/282 416/230 |
| 2015/0184527 A1 * | 7/2015 | Kray | ............... | F01D 5/282 416/224 |
| 2017/0268349 A1 * | 9/2017 | Bryant, Jr. | ............... | F01D 5/282 |
| 2017/0274470 A1 * | 9/2017 | Klein | ............... | B23K 20/021 |
| 2017/0341732 A1 * | 11/2017 | Schneider | ............... | B23P 15/04 |

* cited by examiner

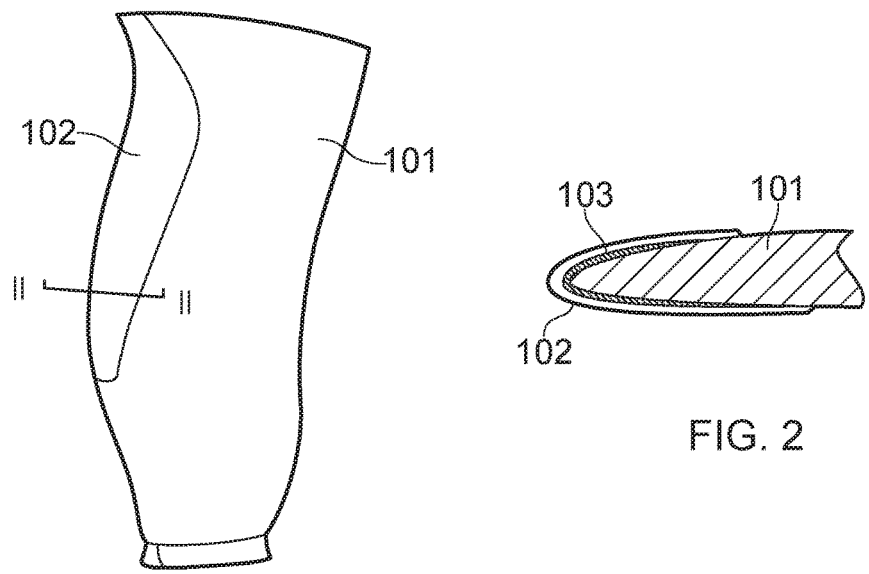
FIG. 1
FIG. 2
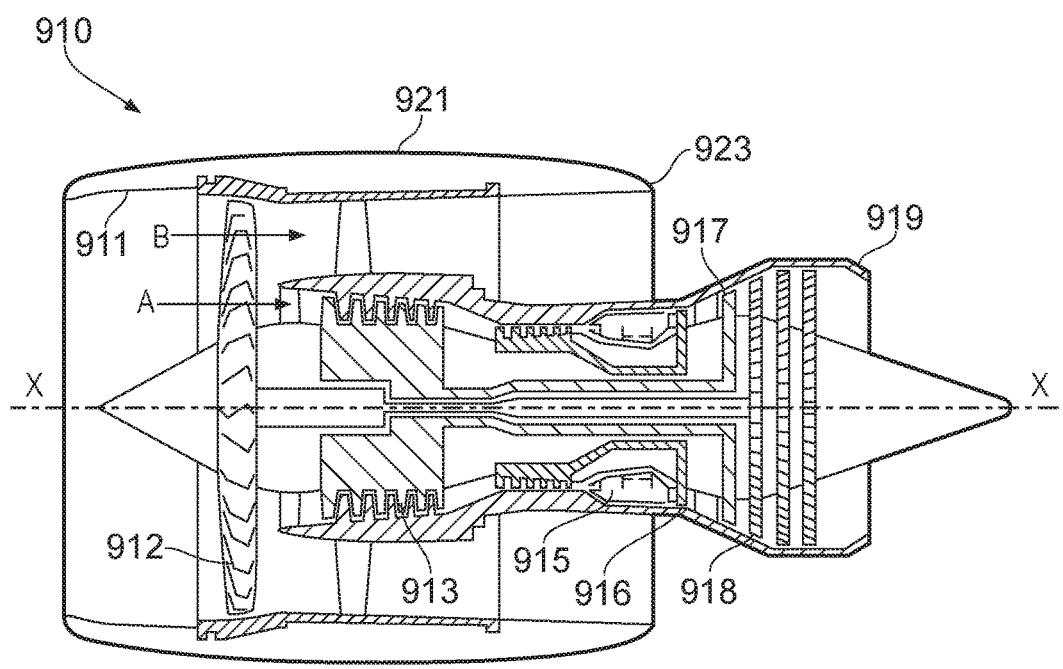
FIG. 3

FAN BLADE AND METHOD OF MANUFACTURING A FAN BLADE

This invention relates to composite bodies made from fibre-reinforced composite material, and to methods of making them. In particular the invention is concerned with novel methods of providing fibre-reinforced composite bodies (components or elements) in structural combination with metal, for example aerofoil elements such as blades and vanes having protective metal edge pieces. A particularly preferred field of application for the invention is in gas turbine engines, for fan blades or rotor blades incorporated, such as in the compressor fan of a ducted fan gas turbine engine.

BACKGROUND

In recent years it has increasingly been proposed to use carbon fibre-reinforced plastics composite materials for the manufacture of gas turbine engine components, including fan and rotor blades, which were originally made from metal because of the high strength requirements. Reinforced composite materials with their low density enable lower component weights—corresponding to e.g. higher fuel efficiency, and also to potentially increased component size by reducing the dynamic stresses arising in rapidly rotating components.

However fibre-reinforced plastics are not optimum for every function; there is still a need for metal components and to have a means for joining them effectively to composite components.

The compressor fan blades of gas turbine (turbofan) engines as used in aerospace are an example. Fibre-reinforced composite blades can withstand normal high operational loads, but safety considerations require that their blades also be able to withstand the impact of airborne foreign bodies, such as in a bird strike, and composite is vulnerable to this. It is therefore known to fix a protective metal sheath or edge guard onto the leading and/or trailing edge of fan blades. See FIGS. 1 and 2: an elongate narrow metal channel 102 shaped to conform to the edge of the fibre-reinforced composite blade 101 is secured by adhesive 103. The metal is typically nickel, steel, titanium or titanium alloy such as Ti 6-4. Typically the edge portion (bullet) of the channel is the thickest, with the side flanges tapering from the edge. Manufacturing the metal edge and composite blade bodies to an exact fit and bonding them together reliably at the fitting interface is difficult and time consuming. Metal plating has been proposed as an alternative, but is neither efficient nor effective. It would be desirable to have an alternative and preferably more efficient and effective method for providing a protective metal edge on a composite blade, vane or other aerofoil element.

There are other situations where it is (or would be) desirable to provide metal portions on a fibre-reinforced composite body to take advantage of characteristic metal properties, such as in features used for fastening, joining or bonding a fibre-reinforced composite body to other bodies, or providing mechanical interfaces engaging relatively movable parts. Such fibre-reinforced composite bodies might be gas turbine engine components, such as blades, vanes or other aerofoil elements, fan casings, housings, gearbox housings and the like.

A typical context is illustrated with reference to FIG. 3, which shows a ducted fan gas turbine engine in which components according to the present invention are desirably implemented. The engine is generally indicated at 910 and has a principal and rotational axis X-X. The engine comprises, in axial flow series, an air intake 911, a propulsive fan 912, an intermediate pressure compressor 913, a high-pressure compressor 914, combustion equipment 915, a high-pressure turbine 916, an intermediate pressure turbine 917, a low-pressure turbine 918 and a core engine exhaust nozzle 919. A nacelle 921 generally surrounds the engine 910 and defines the intake 911, a bypass duct 922 and a bypass exhaust nozzle 923.

During operation, air entering the intake 911 is accelerated by the fan 912 to produce two air flows: a first air flow A into the intermediate-pressure compressor 913 and a second air flow B which passes through the bypass duct 922 to provide propulsive thrust. The intermediate-pressure compressor 913 compresses the air flow A directed into it before delivering that air to the high-pressure compressor 914 where further compression takes place.

The compressed air exhausted from the high-pressure compressor 914 is directed into the combustion equipment 915 where it is mixed with fuel and the mixture combusted. The resultant hot combustion products then expand through, and thereby drive the high, intermediate and low-pressure turbines 916,917,918 before being exhausted through the nozzle 19 to provide additional propulsive thrust. The high, intermediate and low-pressure turbines respectively drive the high and intermediate-pressure compressors 914,913 and the fan 912 by suitable interconnecting shafts.

The Invention

The present inventor proposes a radically different method of providing a metal portion on a composite body, by incorporating metal materials into the procedure by which the composite body is formed.

In a first aspect, we provide a method of making a composite body comprising assembling a body form by laying up multiple overlapping lengths of reinforcement material comprising inorganic fibre reinforcement material, typically carbon fibre;

providing curable polymeric material impregnating the laid-up reinforcement material, and curing the polymeric material to form a solid matrix, characterised by laying up lengths of metal reinforcement as a said reinforcement material at a predetermined region of the body form, to form a metal-containing portion of the composite body.

Desirably the metal reinforcement is laid up in the form of elongate tapes, bands, braids, wires or the like. The skilled person will appreciate that this concept can readily be incorporated into the automated lay-up methods which are generally used to build up fibre-reinforced composite body forms for aerospace elements such as blades, vanes, casings, housings etc. The body form is built up gradually by superimposing successive layers of the elongate fibre reinforcement material, typically (for carbon or glass) in the form of sheets, tapes, bands, tows or filaments, with the type and size of these being selected in dependence on the area and shape complexity of the body form to be made. The laying up of lengths of metal reinforcement at a predetermined region of the body form can readily be incorporated into this well-established technology.

As the skilled person is aware, the impregnation with curable polymeric material (matrix resin) can be provided by using reinforcement material pre-impregnated with the curable matrix resin (pre-preg method), or by assembling the reinforcement materials to the body form with only a holding binder to stabilise the reinforcement as it is laid up, the matrix resin being infiltrated into the body and cured later (dry fibre placement method). Either is possible in the present proposal, however the dry fibre placement method may often be preferable because it enlarges the options available for supplementary metal-metal bonding of the metal reinforcements as discussed further below.

The metal reinforcement material can be incorporated into the layer build-up by combining it with the inorganic (carbon) fibre reinforcement material in the desired proportions. The proportion can be varied over the metal-containing portion of the body form as desired. Thus, lengths of metal reinforcement such as metal tapes, films, foils or wires can be incorporated into the lay-up together with corresponding tapes, tows or other lengths of carbon fibre reinforcement. They may be laid down from the same placement head as a set of reinforcement elements, with the number proportion of the metal and non-metal materials controlled as adjusted. Or, metal and non-metal reinforcements may be laid down separately such as in separate or successive layers, or adjacent side-by-side sets of reinforcement lengths within one layer, according to the circumstances, the shape of the body form and the nature of the metal-containing portion to be made. Another possibility is to prepare hybrid reinforcement materials including a combination of metal and non-metal material.

It is particularly preferred that the method includes a step of bonding adjacent metal reinforcement elements to one another directly, after the laying-up, by metal-to-metal bonding. This integrates and strengthens the metal-containing portion of the body. Desirably this bonding uses a fusion method such as welding, brazing or other method, which might or might not involve raising metal components to or above their melting points. A preferred method comprises interlayer bonding by fusing a metal bonding material between the metal reinforcement elements to join them together. This is suitable especially insofar as the metal reinforcements are generally laminar (tape, foil etc.) and can present large smooth surfaces to one another in adjacent layers. The fusible interlayer material is desirably a powder material. Powder interlayer bonding is a known method. For example fusible interlayer material is carried on the additional reinforcement elements at the time of laying up, e.g. by means of a binder material, and fused to bond the metal reinforcements together after assembly of the body form. Energy for the fusion may be supplied by any appropriate method, such as by ultrasound, electrical resistance, direct heating, laser heating or induction.

While it is possible for the metal-containing portion to constitute or extend over the whole of a composite body, usually the metal-containing portion will be only a part and there will be an adjacent non-metal-containing region of reinforced composite, typically reinforced only by carbon fibre. It is particularly preferred that at the metal-containing portion, the reinforcement material is laid up with the proportion of metal reinforcement relative to non-metal reinforcement increasing from a lower to a higher proportion. There may be a progressive increase or gradation, e.g. from a lower to a higher proportion, to maximise the integration of the properties of the metal and non-metal reinforcements together. Desirably the metal-containing portion includes a full-metal portion where all of the reinforcement is metal. Optionally, all the material or all the reinforcement material of the body is metal at this portion, depending on whether the process and materials used lead to the presence of a non-metal (e.g. polymer) surrounding matrix at this portion.

The metal-containing portion is desirably at a surface, especially an exterior surface, of the composite body. Where there is an all-metal portion of the metal-containing portion, it is desirably at the surface. Metal reinforcement is desirably exposed at the surface.

Taking into account the general nature of components in which the present technology is likely to be useful, the body form desirably consists of or comprises a flattened or layer form, having first and second major faces which are oppositely directed. It may take for example the form of a plate, wall, band, tube, flange, blade, vane, housing, cylinder or the like. In such forms the major faces may meet via an edge portion having an edge surface extending between the major faces. This edge may be an exterior edge of an extended or elongate component, such as the edge of a tube, band, casing, blade, vane, flange, plate or the like, or it may be an edge surrounding an opening.

It is particularly envisaged that the metal-containing portion of the composite body may be at such an edge. The proportion of metal reinforcement relative to carbon may increase, especially progressively or gradually, towards the edge. At the edge, all reinforcement may be metal i.e. desirably metal reinforcement is 100% or substantially all of the reinforcement. The metal reinforcement may be exposed at the exterior of the composite body form at the edge.

Metal-to-metal bonding of the metal reinforcements to one another may in particular be provided at a region of the metal-containing portion which is exposed at a surface, such as at an edge as described. This may provide a solid or integrated metal surface.

Where there is a proportion of metal reinforcement increasing towards an edge region from an adjacent region of the body form at the metal-containing portion, the increasing proportion of metal reinforcement may exist generally through the thickness of the body form (i.e. in a direction from one main surface to the other, opposed main surface, at the edge portion), or there may be an increased proportion of metal which is localised at the surface of the body form.

Generally as mentioned a main region of the body form away from the edge region and/or away from the metal-containing portion desirably has only carbon fibre reinforcement, without metal reinforcement.

A second aspect of the invention is a composite body, desirably one obtained or obtainable by any method as described herein, and comprising a body form comprising multiple overlapping laid-up layers made from lengths of reinforcement material embedded in a cured polymeric matrix material, the body form comprising a metal-containing portion where the reinforcement material comprises both carbon fibre reinforcement and metal reinforcement.

The composite body may have features corresponding analogously to those described in the method aspect above. Thus, for example the metal-containing portion is desirably at a surface and preferably at an edge of the composite body. Desirably the proportion of metal reinforcement relative to carbon reinforcement increases progressively or gradually towards the exterior of the body form or towards an edge thereof. At the surface of the metal-containing portion, all reinforcement may be metal. Desirably the reinforcement elements are fused to one another in the metal-containing portion, such as at least at a surface or exterior region thereof.

The composite body may be of any of the kinds suggested above, and in particular is preferably a gas turbine engine component. It may be for example a fan blade having a metal-containing edge, or other fibre-reinforced composite component having one or more metal-containing portions at load introduction points or features, such as a flange on a fan casing or the composite housing of a gearbox.

The skilled person is already familiar with suitable methods, materials and apparatus for the building up of a body form, such as that of an aerofoil element, by the automated fibre placement of carbon fibre-reinforced composite material, so this need not be described in detail. The matrix polymer material is typically an epoxy resin, although other high temperature thermosetting, binder stabilised "dry tape" materials and specialised engineering thermoplastics such as PEEK polymer may be used depending on the technical requirements for the element. In the case of thermoplastics, "curing" as used herein refers to setting.

Carbon fibres may be applied in the form of binder-stabilised or pre-impregnated bundled elements such as tapes or tows, as is well known.

For aerospace purposes desirably the metal reinforcement is of titanium or titanium alloy such as Ti 6-4. However other metals may be used. The metal reinforcement may be provided in the form of an elongate tape or foil element, optionally pre-coated with adhesive or polymerisable matrix material, optionally pre-coated with fusible metallic bonding powder appropriate for use with the metal foil, to be laid down in combination with the carbon fibre elements.

Conventional skill and knowledge may be used in selecting the multiple directions of application and overlaying of the lengths and layers of reinforcement material to achieve suitable strength characteristics of the element. For example the lay-up usually favours the radial direction in the case of a rotary element such as a fan or rotor blade. The general format of such a blade is elongate, with the main body of the blade having a tip, root, leading edge and trailing edge extending from root to tip and presenting the oppositely-directed main surfaces (a compression face and a suction face, in the case of a fan) between the leading edge and trailing edge regions.

The root may incorporate integrally a securing formation for fastening the blade to a hub, or it may be adapted for fastening to such a formation.

Advantages of our proposal are readily understood. In a fan blade, for example, because the provision of the more impact-resistant metal shield is incorporated into the process for assembling the composite body form, the very laborious procedures of accurately shaping a separate guard element to fit the composite body, and of bonding it on with adequate strength and reliability, can be avoided altogether. Desirably the provision of an external (discrete) metal sheath or guard member can then be dispensed with altogether. In other contexts, analogous advantages are available.

The invention is now explained in more detail with reference to the accompanying drawing figures, in which FIGS. 1 and 2 have already been described and show a conventional form of metal sheath used for edge protection on a fan blade, in face view pre-assembly and as a chordwise section after assembly;

FIG. 3 has already been described and shows a gas turbine engine in which components embodying the invention may be used;

Figure 4:
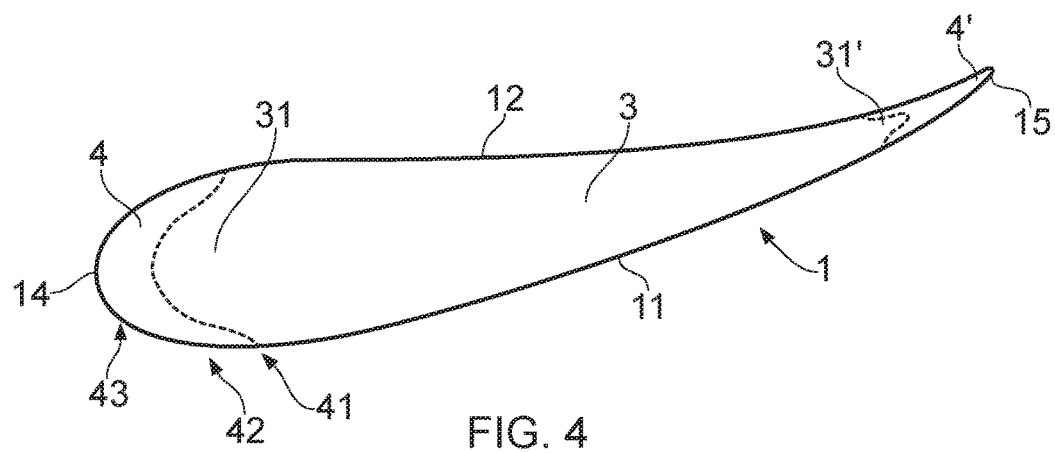
FIG. 4 is a chordwise section showing a graded composition of reinforcement materials in a fan blade embodying the present invention.

FIG. 4 is a chordwise section of a compressor fan blade 1 embodying the composite body of the invention. According to the conventional form it has a suction face 11 and a compression face 12 constituting oppositely-directed main faces of the body 1, and a leading edge 14 and trailing edge 15 whose edge surfaces connect to the main faces 11, 12. Each of the leading edge 14 and trailing edge 15 comprises integrally a metal-containing edge portion 4,4', the inwardly-directed boundary of which is indicated schematically by broken lines. The body form 1 has a main part 3 consisting of carbon fibre-reinforced plastics, e.g. epoxy resin, and this main part 3—which contains no metal—has leading and trailing projections 31,31' extending inside the metal-containing portions 4,4' which are U-shaped or channel-shaped in form, although integral with the body 1.

Figure 5:
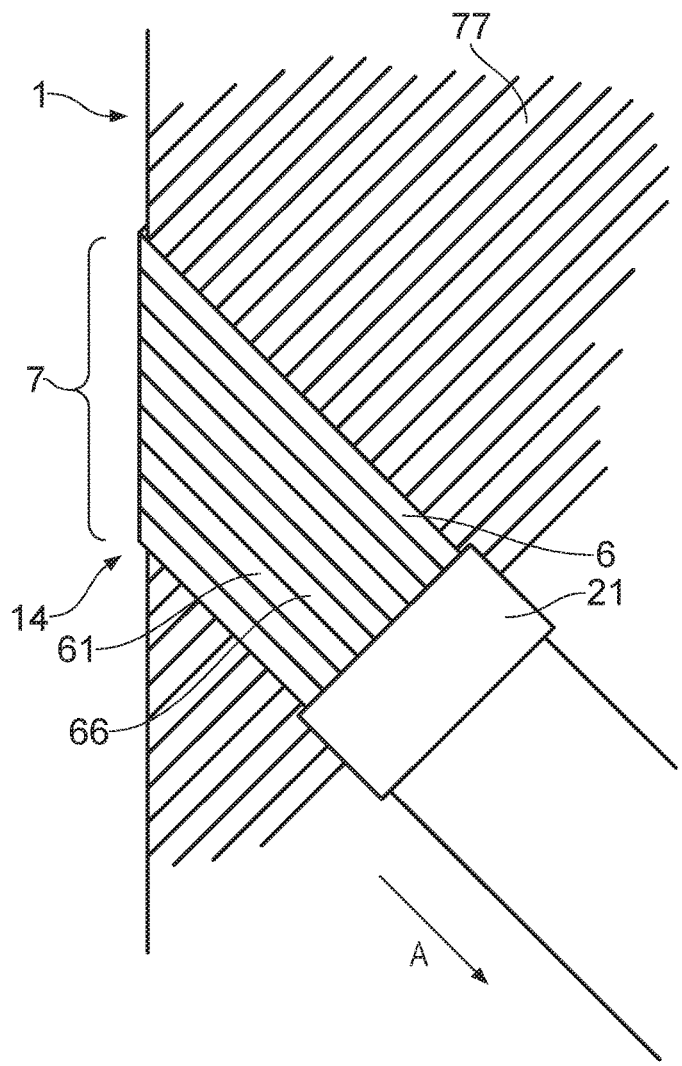
FIG. 5 is a schematic fragmentary face view near the edge of the composite body form for the blade during assembly, showing reinforcement being laid up.

According to a generally known method the body form 1' is assembled by laying up (superimposing) successive layers of elongate reinforcing materials 6. FIG. 5 shows this operation schematically near the leading edge 14. An AFP (automated fibre placement) head 21 is moved automatically over the surface of the body form 1' to lay down a course 7 of multiple side-by-side elongate reinforcement elements 6. The AFP head 21 incorporates a resilient presser to press the set of reinforcements 6 down against the layer 77 below, and is supplied with lengths of reinforcement which can be selectively stopped, started or cut, or one material substituted for another, so that the course 7 may consist entirely of carbon fibre tape 66, of metal tape/foil 61 (e.g. of titanium or titanium alloy), or of a combination of metal and carbon tape simultaneously, at controlled proportion. The skilled person will be aware that carbon fibre tape and metal tape can be laid by alternative apparatus and methods, such as by winding and the like. Also the metal may be laid up in an operation distinct from the laying up of carbon, but the present proposal of simultaneous laying up of metal and carbon is preferred for efficiency and because it allows close integration of the materials and fine local adjustment of the proportion of one to the other.

Figure 7:
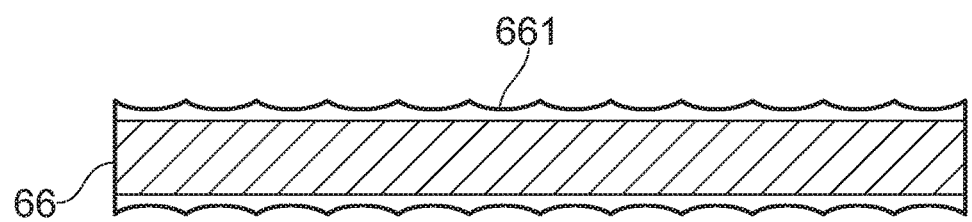
FIG. 7 is a schematic cross-section through a metal reinforcing tape.

In the illustrated embodiment the carbon fibre tape 66 is laid by a "dry fibre" method in which it is coated only with an adhesive binder 661 (see FIG. 7) to hold it in place on the adjacent composite layers 7,77. Again as well known, an alternative is to feed the carbon fibre as pre-impregnated tapes or tows carrying the curable polymer which will form the matrix of the composite body.

Figure 6:
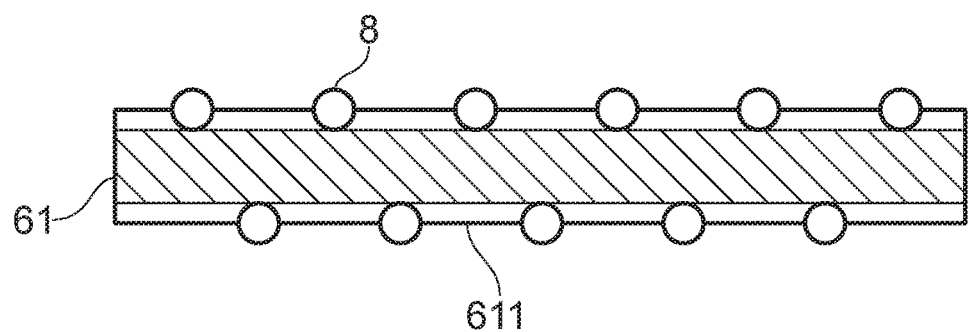
FIG. 6 is a schematic cross-section through a metal reinforcing tape.

The metal tape is desirably fed in a form adapted for subsequent metal-to-metal bonding, e.g. as shown in FIG. 6 which shows schematically the metal tape 61 e.g. of titanium or titanium alloy, carrying on its surfaces a layer of fusible metal particles 8. These are of a suitable composition to promote metal to metal joining. They may for example be of the same composition as the tape e.g. titanium or titanium alloy. An adhesive binder layer 611 holds the fusible metal particles 8 in place and may additionally help to bind the dry reinforcement assembly together as the body 1' is laid up. Tape of Ti or Ti 6-4 for example is readily available.

In accordance with present proposals, the metal reinforcements 61 are introduced into the lay-up towards the leading and trailing edge regions 14,15, in increasing proportion towards the surface thereof and in increasing proportion towards the edge thereof (relative to the main body 3) so as to create the metal-containing portion or metal edge portion 4,4' in each case. Thus, the metal-containing edge portion 4 begins at a low-metal region 41 where e.g. about one third of the laid-up reinforcements are metal, through an intermediate-metal region 42 where e.g. about two thirds of the reinforcements are metal, to an all-metal region 43 at the edge tip where all of the reinforcements are metal reinforcements 61 so that—especially when dry fibre placement is being used—the material consists essentially of side-by side metal tapes adhered to corresponding metal tapes beneath. Of course the tapes of different layers are differently oriented, as is well known.

Figure 8:
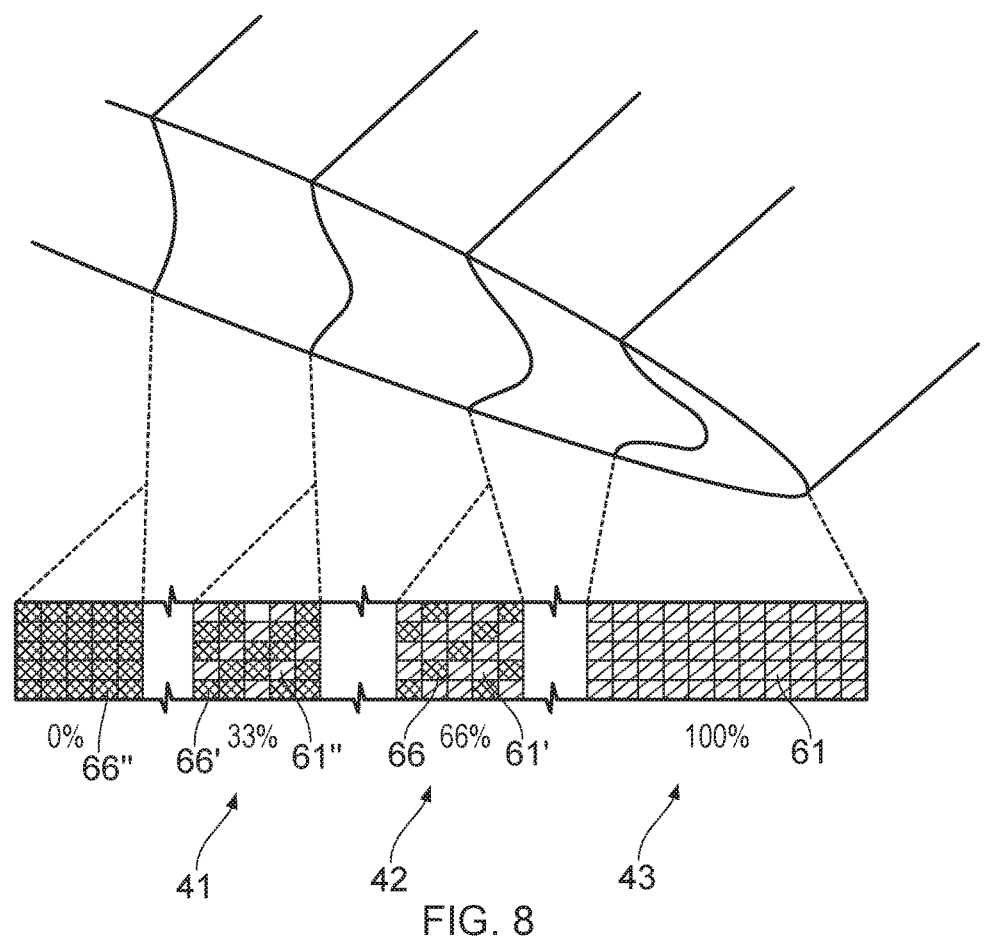
FIG. 8 is a schematic fragmentary chordwise sectional view near the edge of the composite body form, showing metal and carbon reinforcement tapes as laid up.

In practice such a body form usually contains some hundreds of layers, with the overlying carbon and metal tapes running in different directions, so the cross-sectional fragmentary view shown in FIG. 8 is highly schematic and simplified. It shows schematically (and in fragmentary longitudinal sections) four regions progressively further from the edge. At the edge region on the right of the figure, all of the tapes are metal tapes 61. The metal percentage among the reinforcing tapes is indicated by the % value beneath each fragmentary section. Further towards the left of the figure, into the main body of the blade, the metal tapes 61 are interspersed among carbon tapes 66 at progressively decreasing proportions: at the first inward region at 66% metal 61' to one-third carbon 66, at the next region 33% metal 61" to two-thirds carbon 66' and at the fourth region entirely carbon tape 66".

At this stage various procedures are possible to accommodate metal-to-metal bonding of the metal tapes 61. Where the carbon elements (at least) are pre-impregnated with curable polymer, or following an impregnation stage with curable polymer which avoids impregnating the edge region, the matrix may be cured to consolidate the composite element, leaving the metallic tapes 61 generally un-joined because to the extent that are not encapsulated in polymer. By applying local heating to the metal-containing region 4 the interlayer powder particles 8 can be fused to form a direct joint—effectively brazed—between the metal tapes 61 of adjacent layers.

Figure 9:
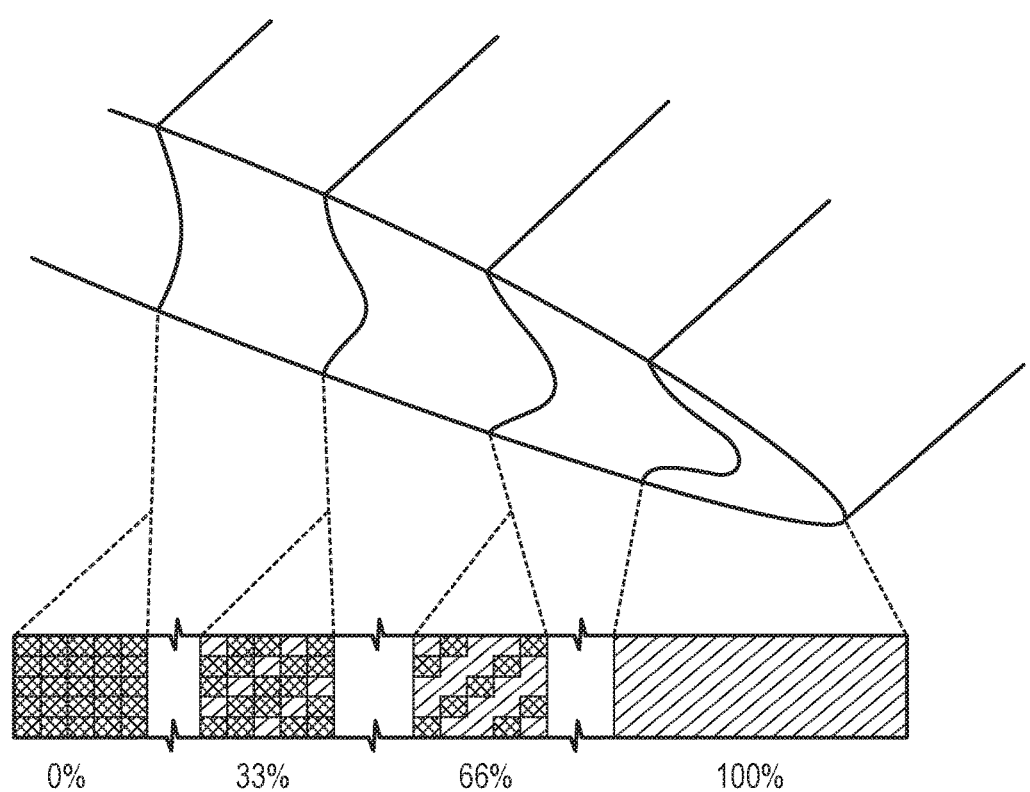
FIG. 9 is a schematic fragmentary chordwise sectional view corresponding to FIG. 8 showing a first mode of bonding the metal tapes.
Figure 10:
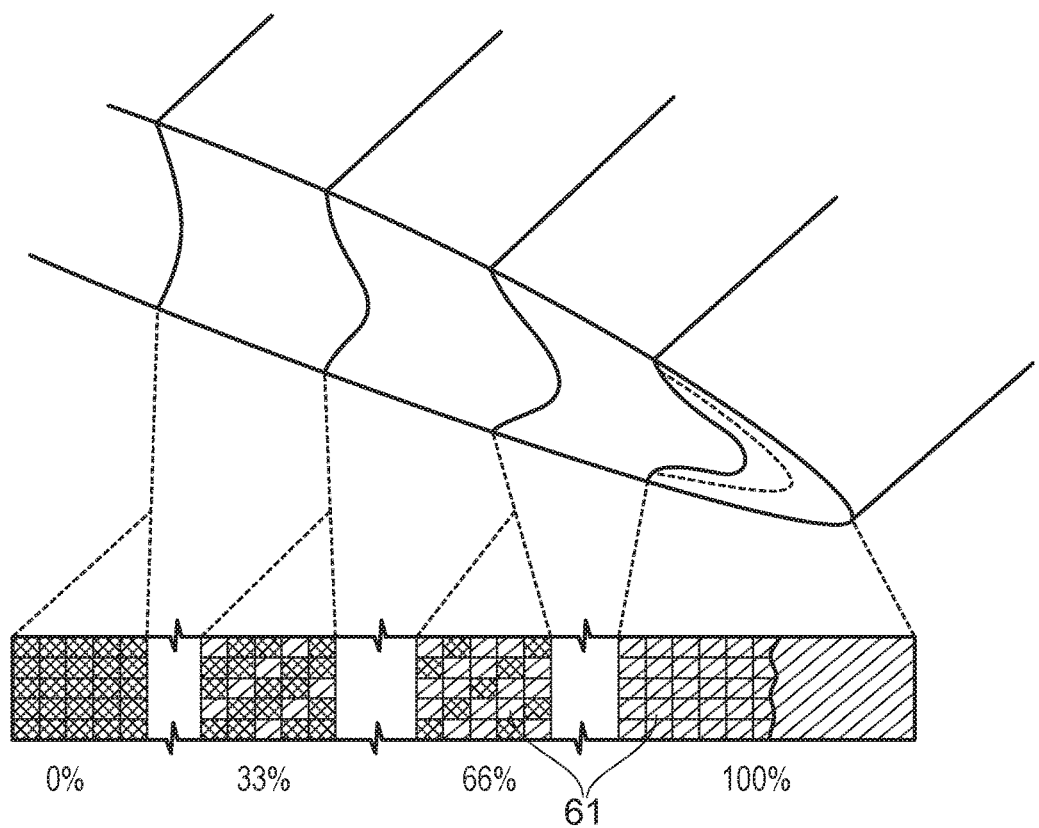
FIG. 10 is a schematic fragmentary chordwise sectional view corresponding to FIG. 8 showing a second mode of bonding the metal tapes.

Any suitable heating method may be used, such as induction heating, resistance heating or direct heat. A possible disadvantage of this method, depending on the conditions required for metal-to-metal joining, is that the metal bonding conditions may adversely affect the matrix resin nearby. However, it is possible to reduce this adverse effect by directing the metal heating only to regions not impregnated with polymer composite, so that while some metal layers must then rely on the composite polymer to hold them in place (i.e. without metal-to-metal bonding) the all-metal regions towards the edge can still be fusion-bonded. FIGS. 9 and 10 show these alternatives, FIG. 9 shows all available metal-to-metal bonding done by welding, so that at the edge region the metal piece is fully integrated, at the next region only partially while by the third region metal tapes are separated by carbon tapes. FIG. 10 shows metal-to-metal bonding done only at an all-metal region localised near the edge, with some adjacent metal tapes 61 further from the edge being joined only via the polymer matrix.

In a more preferred procedure, metal-to-metal bonding of the metal tapes 61, e.g. by fusion bonding such as powder interlayer bonding as described, is done in the absence of the curable matrix polymer. This can be achieved by assembling the composite body 1' under "dry fibre placement" conditions, i.e. using only a stabilising binder 661 on the carbon fibre tapes 66. The body having been assembled with the requisite distribution of metal reinforcements at the metal-containing portions, these portions can then be subjected to conditions to effect the metal-to-metal bonding, such as by powder interlayer fusion. Subsequently, liquid polymer matrix resin can be infiltrated into the fibrous permeable body lay-up—this is known—and then cured. In this way the matrix resin is not exposed to the high temperature conditions normally required for metal-to-metal bonding. The same structural and bonding options as in FIGS. 8 to 10 are still available.

The skilled person will appreciate that the mode and extent of metal-to-metal bonding can be chosen in dependence of the form of the component and the performance requirements on the resulting metal-containing portion. In some cases regions of the metal reinforcement may be joined only by adhesive means e.g. by matrix polymer or by separate binder, with other portions e.g. at the surface being metal-to-metal bonded for example by welding, such as by resistance welding, laser welding or friction stir welding, to connect the metal elements to one another and close the surface.

If necessary the exposed metal surface can then be finished by other means. In the example herein of a fan blade, it may be ready for use. In other situations the metal part may have to undergo further processing for connection to another part, such as a metal part.

The invention claimed is:

1. A method of making a fan blade comprising:
   assembling a body form by laying up multiple overlapping lengths of carbon fiber reinforcement material;
   providing curable polymeric material impregnating the laid-up carbon fiber reinforcement material, and
   curing the polymeric material to form a solid matrix,
   laying up lengths of metal reinforcement material at a predetermined region of the body form to form a metal-containing portion of the fan blade,
   wherein the carbon fiber reinforcement material and metal reinforcement material are laid-up such that regions of low metal and full metal are formed,
   wherein the regions are laid up such that a proportion of metal reinforcement material relative to carbon reinforcement material increases from the low metal region to the full metal region, and
   wherein a portion of an exterior edge of the fan blade is formed by the full metal region containing only metal reinforcement material.

2. A method according to claim 1 in which the lengths of carbon fiber reinforcement material and metal reinforcement material are laid up by automated fiber placement from a placement head.

3. A method according to claim 2 in which the lengths of carbon fiber reinforcement material and metal reinforcement material are laid up side by side from the same placement head.

4. A method according to claim 1 comprising bonding adjacent metal reinforcement material lengths by metal-to-metal bonding.

5. A method according to claim 4 in which adjacent metal reinforcement material lengths are bonded by welding and/or by interlayer powder bonding.

6. A method according to claim 5 in which the metal reinforcement material lengths carry fusible metal powder for powder bonding of the lengths of metal reinforcement material.

7. A method according to claim 4 in which the curable polymeric material is impregnated into the assembled body form after the bonding of the metal reinforcement material lengths.

8. A fan blade having a body form comprising lengths of carbon reinforcement material embedded in a cured polymeric matrix material and lengths of metal reinforcement material,
  wherein the lengths of carbon fiber reinforcement material and lengths of metal reinforcement material are provided such that regions of low metal and full metal are formed within the body,
  wherein the low metal region and full metal region are provided such that a proportion of metal reinforcement material relative to carbon reinforcement material increases from the low metal region to the full metal region, and
  wherein a portion of an exterior edge of the fan blade is formed by the full metal region containing only metal reinforcement material.

9. The fan blade according to claim 8 wherein at least some of the lengths of the metal reinforcement material are fused at the exterior edge of the fan blade.

10. The fan blade according to claim 8 wherein the exterior edge of the fan blade includes a leading or trailing edge.

11. A gas turbine engine containing a fan blade as recited in claim 8.

* * * * *